(12) United States Patent
Barak

(10) Patent No.: US 11,100,241 B2
(45) Date of Patent: *Aug. 24, 2021

(54) VIRTUAL TRAP PROTECTION OF DATA ELEMENTS

(71) Applicant: Palo Alto Networks, Inc., Santa Clara, CA (US)

(72) Inventor: Gil Barak, Ra'anana (IL)

(73) Assignee: Palo Alto Networks, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/698,510

(22) Filed: Nov. 27, 2019

(65) Prior Publication Data

US 2020/0193041 A1    Jun. 18, 2020

Related U.S. Application Data

(63) Continuation of application No. 15/492,338, filed on Apr. 20, 2017, now Pat. No. 10,496,836.

(60) Provisional application No. 62/325,466, filed on Apr. 21, 2016.

(51) Int. Cl.
*G06F 21/62* (2013.01)
*H04L 29/06* (2006.01)

(52) U.S. Cl.
CPC ......... *G06F 21/62* (2013.01); *H04L 63/1408* (2013.01); *H04L 63/1491* (2013.01)

(58) Field of Classification Search
CPC .. G06F 21/62; H04L 63/1408; H04L 63/1491
USPC .......................................................... 726/23
See application file for complete search history.

(56) References Cited

U.S. PATENT DOCUMENTS

| | | | |
|---|---|---|---|
| 9,602,536 B1 * | 3/2017 | Brown, Jr. .......... | H04L 63/1491 |
| 10,009,360 B1 | 6/2018 | Todd | |
| 2007/0271610 A1 * | 11/2007 | Grobman ................ | G06F 21/53 726/22 |
| 2009/0328216 A1 * | 12/2009 | Rafalovich ......... | H04L 43/0876 726/23 |
| 2017/0032118 A1 | 2/2017 | Carson | |
| 2017/0090821 A1 | 3/2017 | Woodward | |

* cited by examiner

*Primary Examiner* — Mohammad W Reza
(74) *Attorney, Agent, or Firm* — Gilliam IP PLLC

(57) ABSTRACT

To prevent ransomware from encrypting data elements stored in a memory of a computer-based system, the system identifies at least one identifier associated with a data element. The identifiers indicate an attribute(s) of the corresponding data element within the memory. The system then determines an optimal number of virtual traps for the data elements respective of at least one identifier. The system then determines an optimal position for each virtual trap corresponding to the at least one identifier. The system then positions the virtual traps at the determined position within the memory. The system monitors the data elements stored in the memory in order to identify whether changes have occurred, and determines respectively updated optimal number and positions of virtual traps.

17 Claims, 2 Drawing Sheets

VIRTUAL TRAP PROTECTION OF DATA ELEMENTS

BACKGROUND

The present disclosure generally relates to data security, and more specifically, to a system and methods for preventing ransomware from encrypting data in a computer-based system.

Nowadays, as organizations and enterprises are getting bigger, they are more and more exposed to malicious attacks. Kaspersky® reports detections of over 300,000 different malware variants in a single day. The United Kingdom government reports over 100,000 cyber-attacks on British companies every day.

Malware is an umbrella term used to refer to a variety of forms of hostile or intrusive software, including computer viruses, worms, trojan horses, spy ware, ransomware, and other malicious programs. While some are easy to prevent by simple actions, others may be much harder and may also cause much more damages. One of the destructive malicious programs is the ransomware.

Ransomware is a malware that restricts access to the infected computer system in a certain way, and demands that the user pay a ransom to the malware operators to remove the restriction. Some forms of ransomware systematically encrypt files on the system's hard drive, which become difficult or impossible to decrypt without paying the ransom for the encryption key. Another form of ransomware simply locks the system and displays messages intended to coax the user into paying. In June 2013, security software vendor Mcafee® released data showing that it had collected over 250,000 unique samples of ransomware in the first quarter of 2013, more than double the number it had obtained in the first quarter of 2012.

Since ransomware became a global epidemic, many technologies companies are trying to find the ultimate solution to deal with ransomwares. Nevertheless, efficient solutions have not yet been introduced.

In the view of the shortcoming of related art, it would be advantageous to provide an efficient solution for preventing ransomware from encrypting and/or locking data in a computer-based system.

SUMMARY

A computerized method for preventing ransomware from encrypting data elements stored in a memory of a computer-based system, the method comprising identifying at least one identifier for a data element, wherein the at least one identifier indicates at least a position of the data element within the memory. An optimal number of virtual traps is determined for the data element corresponding to the at least one identifier. An optimal position for each of the virtual traps is determined corresponding to the at least one identifier. The virtual traps are send to the determined optimal position within the memory.

In an enhancement, the data element is at least one of: a folder, a sub-folder, a file, a process.

In another enhancement, each of the virtual traps is one of: a virtual file, a virtual folder, a virtual sub-folder, a virtual process, a virtual memory object, a virtual registry key, a virtual removable device, a virtual physical device, a virtual network device, a virtual network share.

In yet another enhancement, the method further comprises determining that a suspicious process is being performed on at least one virtual trap.

More specifically, the method comprises generating a notification corresponding to the determination.

More specifically, the method comprises initializing, based on the notification, at least one computerized process to prevent the suspicious process.

In another enhancement the method comprises monitoring constantly the plurality of data elements stored within the memory in order to identify whether changes have occurred.

More specifically, the method further comprises determining an updated optimal number of virtual traps for the plurality of data elements upon identification of changes.

Even more specifically, the method comprises determining an updated optimal position for each of the virtual traps upon identification of changes.

Still more specifically, the method comprises sending the updated number of virtual traps to the updated position within the memory.

Another aspect of the disclosed teachings is a system for preventing ransomware from encrypting data elements stored in a memory of a computer-based system, the system comprises an interface, a processing unit and a memory coupled to the processing unit, the memory contains therein instructions that when executed by the processing unit configures the system to prevent ransomware. The processor identifies at least one identifier for a data element, wherein the at least one identifier indicates a position of the data element within the memory. The processor further determines an optimal number of virtual traps for the data element corresponding to the at least one identifier and an optimal position for each of the virtual traps corresponding to the at least one identifier. The processor sends the virtual traps to the determined optimal position within the memory.

In an enhancement, the data element is at least one of: a folder, a sub-folder, a file, a process.

In another enhancement, a virtual trap is one of: a virtual file, a virtual folder, a virtual sub-folder, a virtual process, a virtual memory object, a virtual registry key, a virtual removable device, a virtual physical device, a virtual network device, a virtual network share.

In another enhancement the processor determines that a suspicious process is being performed on the at least one virtual trap.

In another enhancement the processor generates a notification respective of a determination that the suspicious process is attempting an encryption of the data element.

More specifically, the processor initializes, based on the notification, at least one computerized process adapted to prevent the suspicious process of performing encryption of any of the data elements.

In another enhancement, the processor monitors constantly the plurality of data elements stored within the memory in order to identify whether changes have occurred.

More specifically, the processor determines an updated optimal number of virtual traps for the plurality of data elements upon identification of changes that were occurred within the memory.

Even more specifically, the processor determines an updated optimal position for each of the virtual traps upon identification of changes that were occurred within the memory.

Still more specifically, the processor sends the updated number of virtual traps to the updated position within the memory.

Other aspects of the disclosed teachings include a computer program product including a computer readable medium comprising computer executable program recorded on a computer readable non-transitory storage medium, said computer executable program code when executed causes the computer to implement the methods discussed above and assists in implementing the systems disclosed above.

BRIEF DESCRIPTION OF THE DRAWINGS

The subject matter that is regarded as the disclosure is particularly pointed out and distinctly claimed in the claims at the conclusion of the specification. The foregoing and other objects, features, and advantages of the disclosure will be apparent from the following detailed description taken in conjunction with the accompanying drawings.

DETAILED DESCRIPTION

Figure 1:
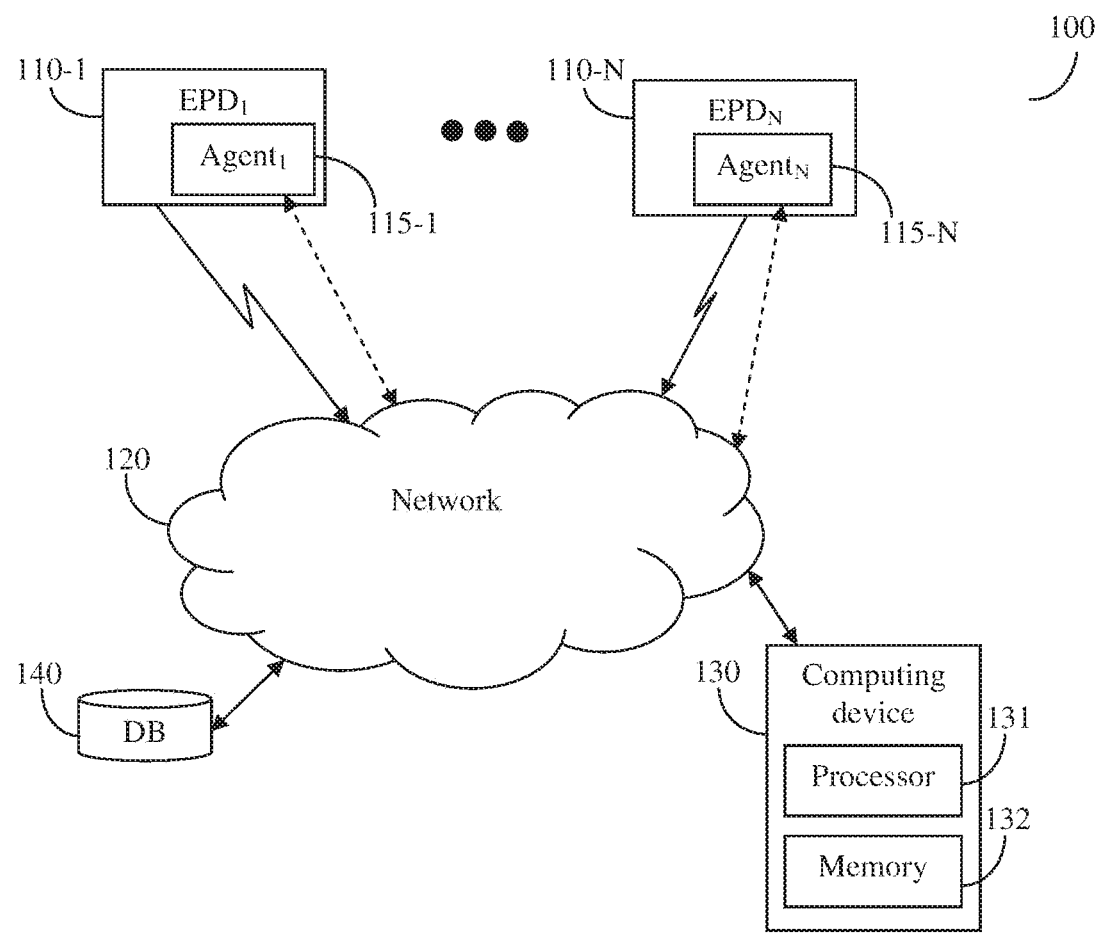
FIG. 1—is a schematic block diagram of a system for preventing ransomware from encrypting data in a computer-based system according to an embodiment; and, FIG. 2—is a flowchart describing a process for preventing ransomware from encrypting data in a computer-based system according to an embodiment.

It is important to note that the embodiments disclosed by the disclosure are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

A system and methods thereof for preventing ransomware from encrypting data elements stored in a memory of a computer-based system. The system identifies at least one identifier associated with a data element. The identifiers indicate a position of the corresponding data elements within the memory. The system then determines an optimal number of virtual traps for the data elements respective of at least one identifier. The system then determines an optimal position for each virtual trap corresponding to the at least one identifier. The system then positions the virtual traps at the determined position within the memory. According to an embodiment the system monitors constantly the data elements stored in the memory in order to identify whether changes have occurred, and determines respectively updated optimal number and positions of virtual traps.

FIG. 1 depicts an exemplary and non-limiting block diagram of a system 100 used for preventing ransomware from encrypting data elements stored in a memory of a computer-based system according to an embodiment. A network 120 is used to enable communication between the different components of the system 100. The network 120 may be, but is not limited to, a local area network (LAN), a wide area network (WAN), a metro area network (MAN), the world wide web (WWW), the Internet, a wired network, a wireless network, and the like, as well as any combination thereof. A plurality of end point devices (EPD) 110-1 through 110-M, where M is an integer equal to or greater than 1, are communicatively connected to a network 120. The EPDs 110 can be, but are not limited to smart phones, mobile phones, laptops, tablet computers, wearable computing devices, personal computers (PCs), a combination thereof and the like. A plurality of agents 115-1 through 115-M are installed on the EPDs 110-1 through 110-M, and are further connected to the network 120.

A computing device 130 is further connected to the network 120. The computing device 130 is a computer hardware and software component configured to execute predetermined computing tasks. The computing device 130 comprises a processing unit, such as a processor 131 and a memory 132. The memory 132 contains therein instructions that when executed by the processor 131 configures the computing device 130 to execute actions as further described herein below. A database 140 is also communicatively connected to the network 120. The database 140 is coupled to the computing device 130 and configured to store therein data elements and virtual data elements as further described herein below.

According to an embodiment, the computing device 130 uses the agents 115-1 through 115-M installed on the EPD 110-1 through 110-M, respectively, to identify for each of a plurality of data elements at least one identifier associated therewith. The data elements may be for example a folder, a sub-folder, a file, etc., stored within a memory of an EPD 110. The memory at which the data elements are stored, may be for example, a database, a data warehouse, a local memory storage unit, etc., associated with one of the EPDs, for example EPD 110-$k$ and/or with a server communicatively connected to the EPD 110-$k$. The at least one identifier may be for example a file name, a time pointer associated with a saving of a file, a file creation date, a file type, a file creator data, etc. Each of the identifiers indicates at least one of a position of the corresponding data element within the memory, the data element's name, the data element's type, etc.

The computing device 130 then generates virtual traps, respective of the at least one identifier of each of the plurality of data elements. Virtual trap may be for example, a virtual folder, a virtual sub-folder, a virtual file, a virtual process, a virtual memory object, a virtual registry key, a virtual removable device, a virtual physical device, a virtual network device, a virtual network share, etc., stored within the database 140. The generation of the virtual traps may include, for example, determination of an optimal number of virtual traps for the plurality of data elements, a virtual trap's type, a virtual trap's name, etc. The virtual traps are configured to be sent from the database 140 to the memory of the EPD 110-$k$ by the computing device 130. The virtual traps enable the computing device 130 to detect and prevent malwares, such as for example, ransomware, from encrypting the data elements that were stored within the memory of the EPD 110-$k$ by initializing at least one computerized process adapted to prevent the encryption of the data elements. The virtual traps may be determined respective of the identification of the at least one identifier associated with each of the plurality of data elements.

For example, the computing device 130 identifies that the memory associated with the EPD 110-$k$ comprises one folder that comprises 10 files. The computing device 130 analyzes the information and sends 1,000 virtual traps to the memory of the EPD 110-$k$, so that the memory will include 1,010 data elements, 10 are real that need the protection and 1,000 are virtual traps configured to detect at least one malware.

The computing device 130 may further determine an optimal position for each of the virtual traps corresponding to the at least one identifier. Optimal position refers to a first location that is expected to be affected by the malware. For example, a memory comprises a folder that includes 20 files that stored in alphabetical order. The first file according to that order begins with the letter "B". The computing device 130 may determine that the virtual trap's name should begin with the letter "A", so that in case the malware is attempting to encrypt files in an alphabetical order, the virtual trap is expected to be affected first.

According to an embodiment, the optimal position may include more than one position. That is to say that the optimal position may include a plurality of positions at which virtual traps may be located, in order to increase the probability that the virtual traps are first to be affected. For example, a folder comprising a plurality of files arranged in an alphabetical order is stored in the memory of one of the EPDs, for example EPD 110-$h$. The first file's name at the list starts with the letter "B" and the last file's name starts with the letter "Y". The computing device 130 may determine that by generating a file that starts with the letters "A" and "Z" such files are expected to be affected first. According to further embodiment, the computing device 130 may determine the amount of virtual traps to be generated respective of an amount of data elements exist in the memory of the EPD 110-$h$. As an example, in case a folder on the memory of the EPD 110-$h$ comprises 10 files therein, 1,000 virtual traps may be generated and send thereto. It should be clear that such amount of virtual traps is expected to increase the probability that a virtual trap shall be affected first by a malware operating in a random mode.

The computing device 130 then sends the determined virtual traps to the memory, in order to prevent malwares from encrypt, block, etc., data files stored within the memory of the EPD 110-$h$. According to an embodiment, once a malware attempts to encrypt at least one virtual trap that was sent to the memory by the computing device 130, the computing device 130 determines that a suspicious process is being performed on the at least one virtual trap. Upon such determination, the computing device 130 may prevent such processes as well as processes associated thereto from performing further activities through the EPD 110-$h$ and/or the network 120.

According to another embodiment, upon determination that a suspicious process is being performed on the virtual trap(s), the computing device 130 determines that the suspicious process is attempting to encrypt data element stored within the memory. According to another embodiment, the computing device 130 generates a notification corresponding to the determination that the suspicious process is attempting to encrypt data elements. According to another embodiment, the virtual traps may be seamless to a user, e.g., hidden files.

According to further embodiment, the computing device 130 may constantly monitor the plurality of data elements stored within the memory of the EPD 110-1 through 110-M in order to identify whether changes have occurred therein. The changes may include for example, a files' rearrangement, a files' deletion, folders' rearrangement, etc. Upon identification of a change, the computing device 130 may generate updated virtual traps respective thereto.

According to another embodiment, the computing device 130 may determine an updated optimal position for each of the virtual traps upon identification of changes that were occurred within the memory. For example, in case the data elements stored within the memory, which their name begins with "A", were deleted, the computing device 130 may determine an updated optimal position for the virtual traps. That is to say, that the computing device 130 may generate virtual traps that starts with the letter "A" from the database 140, and send those virtual traps to the determined updated position within the memory of the corresponding EPD, from among EPDs 110-1 through EPD-M.

Figure 2:
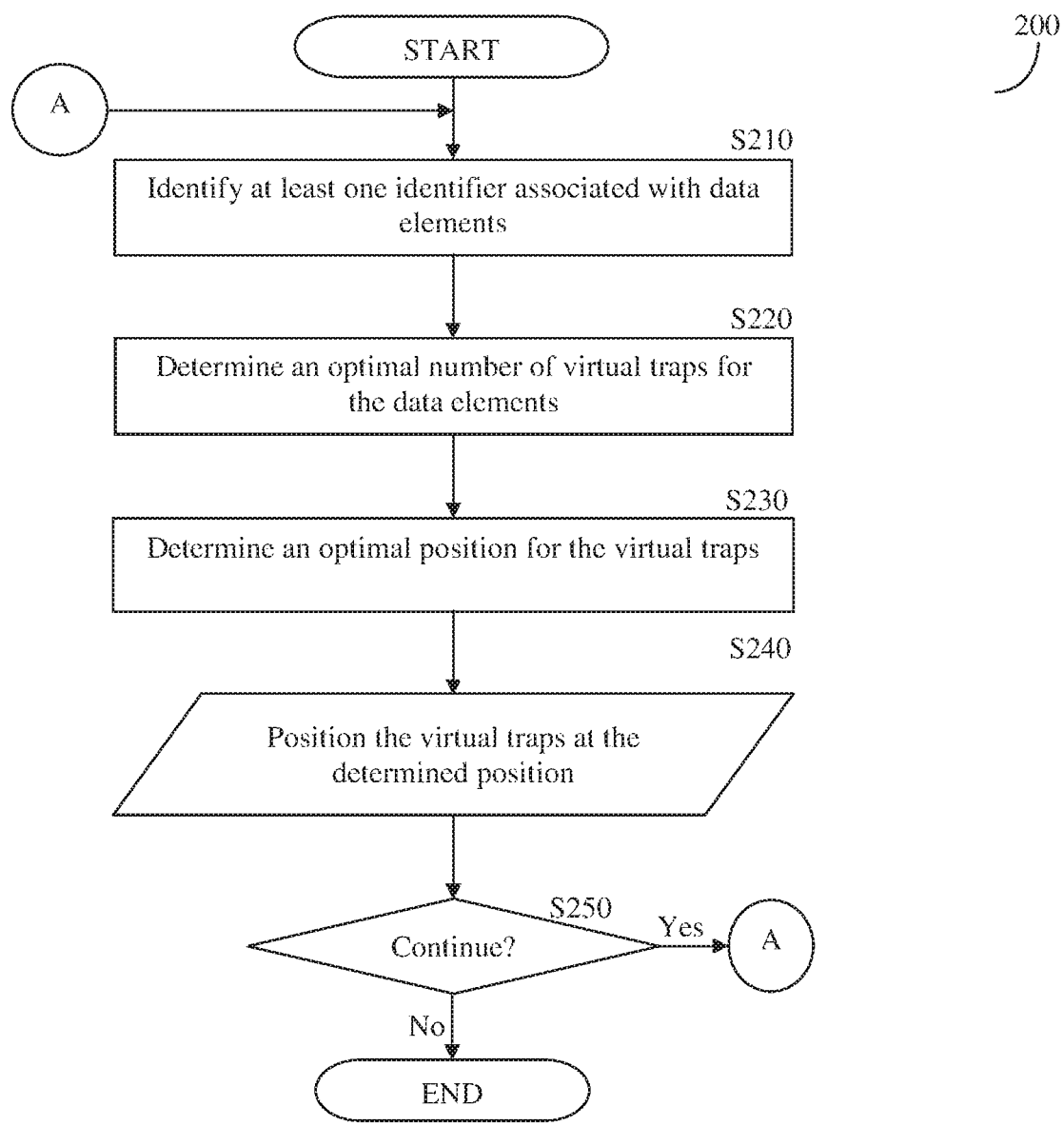

FIG. 2 is an exemplary and non-limiting flowchart 200 describing a method for preventing ransomware from encrypting data elements stored in a memory of a computer-based system according to an embodiment. In S210 the operation starts when the computing device 130 uses one of the agent, for example 115-$k$, installed on the end point device (EPD), for example, EPD 110-$k$ to identify for each of a plurality of the data elements at least one identifier associated therewith. Each of the identifiers indicates at least one of a position of the corresponding data element within the memory, data element's name, data element's type, etc. In S220, the computing device 130 determines an optimal number of virtual traps for the plurality of data elements respective of at least one identifier. In S230, the computing device 130 determines an optimal position for each of the virtual traps respective of at least one identifier. In S240, the computing device 130 sends the virtual traps to the determined position within the memory associated with the EPD 110-$k$. In S250, it is checked whether to continue the operation and if so the execution continues with S210; otherwise, the execution terminates.

The principles of the disclosure are implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

A person skilled-in-the-art will readily note that other embodiments of the disclosure may be achieved without departing from the scope of the disclosed disclosure. All such embodiments are included herein. The scope of the disclosure should be limited solely by the claims thereto.

What is claimed is:

1. A method comprising:
    determining identifiers of a plurality of data elements stored in a memory;
    based, at least in part, on the identifiers, determining virtual trap generation parameters that comprise, at least one of, virtual trap names and one or more virtual trap types;

generating virtual traps for the plurality of data elements at an amount that increases probability malware will affect a virtual trap before one of the plurality of data elements, wherein generating the virtual traps is according to the virtual trap generation parameters;

determining positions for storing the generated virtual traps in the memory relative to corresponding ones of the plurality of data elements; and sending the virtual traps to be stored at the determined positions in the memory to protect the plurality of data elements from malware.

2. The method of claim 1, wherein a data element is one of a folder, a sub-folder, a file, or a process.

3. The method of claim 1, wherein a virtual trap is one of a virtual file, a virtual folder, a virtual sub-folder, a virtual process, a virtual memory object, a virtual registry key, a virtual removable device, a virtual physical device, a virtual network device, or a virtual network share.

4. The method of claim 1, further comprising detecting a suspicious process based, at least in part, on detecting a change or attempted change to one of the virtual traps in the memory.

5. The method of claim 4 further comprising initializing at least one computerized process to prevent the detected suspicious process from changing at least one of the virtual traps in the memory.

6. The method of claim 1 further comprising monitoring the virtual traps stored within the memory for changes or attempted changes.

7. The method of claim 1 further comprising:
generating an additional amount of virtual traps for a first data element based, at least in part, on a detected change or attempted change to a first of the virtual traps that protects the first data element; and
sending the additional virtual traps to the memory to protect the first data element.

8. The method of claim 1, wherein an identifier of a data element indicates at least one of a file name, a folder name, a file save time, a file creation date, a file creator, and a file type.

9. One or more non-transitory computer-readable media having program code stored thereon, the program code comprising instructions to:
determine identifiers of a plurality of data elements stored in a memory;
based, at least in part, on the identifiers, determine parameters for virtual traps to generate, wherein the virtual trap parameters comprise, at least one of, names for the virtual traps to generate and one or more types of virtual traps to generate;
generate an amount of the virtual traps for the plurality of data elements that increases probability that malware will affect a virtual trap before one of the plurality of data elements, wherein the instructions to generate the virtual traps comprise the instructions to generate the virtual traps according to the virtual trap parameters;
determine positions for storing the generated virtual traps in the memory relative to corresponding ones of the plurality of data elements; and
store the virtual traps at the determined positions in the memory to protect the plurality of data elements from malware.

10. The non-transitory computer-readable media of claim 9, wherein a data element is one of a folder, a sub-folder, a file, or a process.

11. The non-transitory computer-readable media of claim 9, wherein a virtual trap is one of a virtual file, a virtual folder, a virtual sub-folder, a virtual process, a virtual memory object, a virtual registry key, a virtual removable device, a virtual physical device, a virtual network device, or a virtual network share.

12. The non-transitory computer-readable media of claim 9, wherein the program code further comprises instructions to monitor the virtual traps for attempted changes or changes to the virtual traps.

13. The non-transitory computer-readable media of claim 12, wherein the program code further comprises instructions to initialize at least one computerized process to prevent a suspicious process detected from monitoring the virtual traps.

14. The non-transitory computer-readable media of claim 9, wherein the program code further comprises instructions to:
generate an additional amount of virtual traps for a first of the plurality of data elements based, at least in part, on a detected change or attempted change to a first of the virtual traps that protects the first data element; and
store the additional virtual traps in the memory to protect the first data element.

15. An apparatus comprising:
a processor; and
a non-transitory machine-readable medium having program instructions stored thereon, wherein the program instructions are executable by the processor to cause the apparatus to, determine identifiers of a plurality of data elements stored in a memory;
based, at least in part, on the identifiers, determine parameters for virtual traps to generate, wherein the virtual trap parameters comprise, at least one of, names for the virtual traps to generate and one or more types of virtual traps to generate;
generate an amount of virtual traps for the plurality of data elements that increases probability that malware will affect a virtual trap before one of the plurality of data elements, wherein the instructions to generate the virtual traps comprise the instructions executable to cause the apparatus to generate the virtual traps according to the virtual trap parameters;
determine positions for storing the generated virtual traps in the memory relative to corresponding ones of the plurality of data elements; and
store the virtual traps at the determined positions in the memory to protect the plurality of data elements from malware.

16. The apparatus of claim 15, wherein the program instructions further comprise program instructions executable by the processor to cause the apparatus to initialize at least one computerized process to prevent a suspicious process detected from monitoring the virtual traps.

17. The apparatus of claim 15, wherein the program instructions further comprise program instructions to:
generate an additional amount of virtual traps for a first of the plurality of data elements based, at least in part, on a detected change or attempted change to a first of the virtual traps that protects the first data element; and
store the additional virtual traps in the memory to protect the first data element.

* * * * *

UNITED STATES PATENT AND TRADEMARK OFFICE
CERTIFICATE OF CORRECTION

PATENT NO. : 11,100,241 B2  
APPLICATION NO. : 16/698510  
DATED : August 24, 2021  
INVENTOR(S) : Gil Barak Page 1 of 1

It is certified that error appears in the above-identified patent and that said Letters Patent is hereby corrected as shown below:

In the Specification

Column 1, Line 56, the portion reading -are send to- should read --are sent to--  
Column 6, Line 6, the portion reading -the agent,- should read --the agents,--

Signed and Sealed this  
Twenty-eighth Day of December, 2021

Drew Hirshfeld  
*Performing the Functions and Duties of the*  
*Under Secretary of Commerce for Intellectual Property and*  
*Director of the United States Patent and Trademark Office*